United States Patent [19]

Kim

[11] Patent Number: 5,696,484
[45] Date of Patent: Dec. 9, 1997

[54] EMERGENCY TURN SIGNAL LAMP DEVICE FOR A VEHICLE

[75] Inventor: Jae-Young Kim, Kyungkido, Rep. of Korea

[73] Assignee: Hyundai Motor Company, Ltd., Seoul, Rep. of Korea

[21] Appl. No.: 667,852

[22] Filed: Jun. 20, 1996

[30] Foreign Application Priority Data

Jun. 21, 1995 [KR] Rep. of Korea .................. 95-16649

[51] Int. Cl.$^6$ .................................................. B60Q 1/52
[52] U.S. Cl. .................. 340/471; 340/472; 340/468; 340/465; 340/487; 340/641
[58] Field of Search .................................. 340/463, 468, 340/471, 472, 480, 487, 641, 642; 362/63, 65

[56] References Cited

U.S. PATENT DOCUMENTS 2,918,566 12/1959 Lunsford .................. 340/472
4,712,051 12/1987 Fathi .................. 340/656
4,894,755 1/1990 Chandler .................. 340/472

FOREIGN PATENT DOCUMENTS 3826598 11/1989 Germany .................. 340/468

Primary Examiner—Jeffery Hofsass
Assistant Examiner—Sihong Huang

[57] ABSTRACT

An emergency signal lamp device for a vehicle, includes a lamp door disposed on a portion of the vehicle, an emergency signal lamp disposed behind the lamp door and being elastically movable from the vehicle, and a latch mechanism for moving the lamp door to control the movement of the emergency signal lamp, whereby the emergency signal lamp generates a turn signal when an original signal lamp is out of order.

20 Claims, 2 Drawing Sheets

EMERGENCY TURN SIGNAL LAMP DEVICE FOR A VEHICLE

BACKGROUND OF THE INVENTION

1. Field of the Invention

The present invention relates to an emergency turn signal lamp device for a vehicle and more particularly, to an emergency turn signal lamp device including an emergency signal lamp disposed behind a left side quarter panel of the vehicle and a lamp door for locking the signal lamp within the vehicle, whereby when the left turn signal lamp is out of order, the emergency signal lamp pops out elastically from the vehicle to generate a left turn signal to prevent a traffic accident from occurring.

2. Description of Related Art

Various types of turn signal lamp devices for a vehicle are known in the art. Generally, a number of lamp devices are installed in a vehicle. Electricity for such lamp devices is supplied by a battery disposed in the vehicle. Also, the lamp devices are turned on and off by the driver or passenger of the vehicle through a plurality of switches.

In such lamp devices, turn signal lamps are periodically flickered to communicate to other vehicles the forward direction of the vehicle. However, more frequently, the left turn signal lamps are out of order due to cut cables and damage to filaments in the lamps. Therefore, at such times, the drivers of the rear vehicles do not know that the left turn signal lamp of the front vehicle is not operating, which could cause traffic accidents.

More seriously, when the vehicle is in the far left lane and the driver wants to turn left suddenly, if the left turn signal lamp is out of order it is possible to have a traffic accident since the rear vehicles do not know that the front vehicle is going to turn left. Thus, while on the road, e.g., a highway, if there is a problem with the turn signal lamps and there is no emergency signal lamps, it is unsafe and becomes difficult to avoid a traffic accident. Furthermore, lives can be lost in the accidents.

SUMMARY OF THE INVENTION

Accordingly, it is an object of the present invention to provide an emergency turn signal lamp device for a vehicle, which eliminates the above problems encountered with conventional turn signal lamp devices.

Another object of the present invention is to provide an emergency turn signal lamp device hidden inside of a quarter panel of a vehicle, whereby when the original turn signal lamps are out of order, the device of the present invention can immediately replace the malfunctioning original lamps.

A further object of the present invention is to provide an emergency turn signal lamp device for a vehicle, which includes a lamp door disposed behind a left and/or right side quarter panel of the vehicle, and an emergency turn signal lamp resiliently movable from the lamp door, whereby when the original turn signal lamp is out of order, the lamp door and the emergency turn signal lamp pop out of the left and/or right side quarter panel so as to generate turn signals and prevent occurrence of a traffic accident.

Still another object of the present invention is to provide an emergency turn signal lamp for a vehicle which is simple in structure, inexpensive to manufacture, durable in use, and refined in appearance.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, an emergency signal lamp device for a vehicle according to the embodiments of the present invention, includes a lamp door disposed on a portion of the vehicle, an emergency signal lamp disposed behind the lamp door and being elastically movable from the vehicle, and latch means for moving the lamp door to control the movement of the emergency signal lamp, whereby the emergency signal lamp generates a turn signal when an original signal lamp is out of order.

Furthermore, the present invention includes a method of providing an emergency signal lamp device in a vehicle, including the steps of detecting malfunctioning of an original signal lamp, activating a switch according to the detection, releasing a latch member by activating the switch, and pivotally moving an emergency signal lamp from the vehicle to generate a turn signal.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
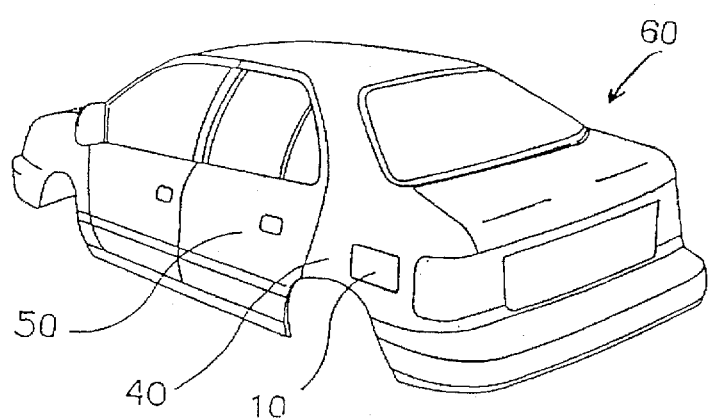
FIG. 1 is a perspective view of a vehicle having an emergency left turn signal lamp device according to the embodiments of the present invention.
Figure 2:
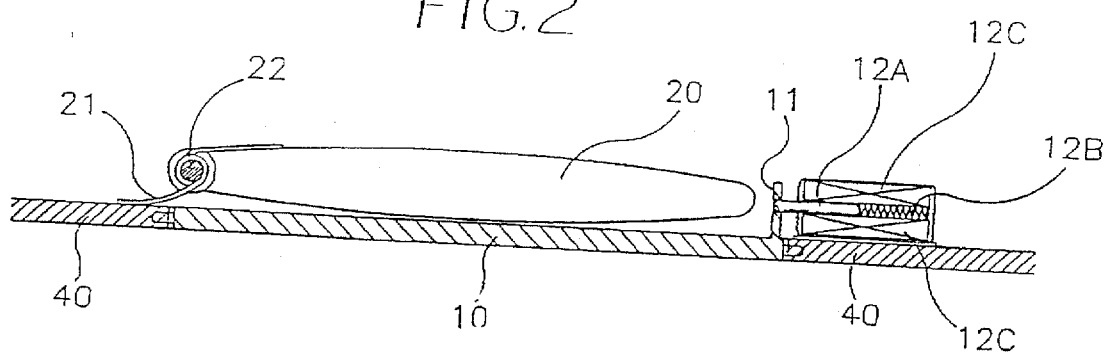
FIG. 2 is a sectional view of the emergency turn signal lamp device for a vehicle according to the embodiments of the present invention.
Figure 3:
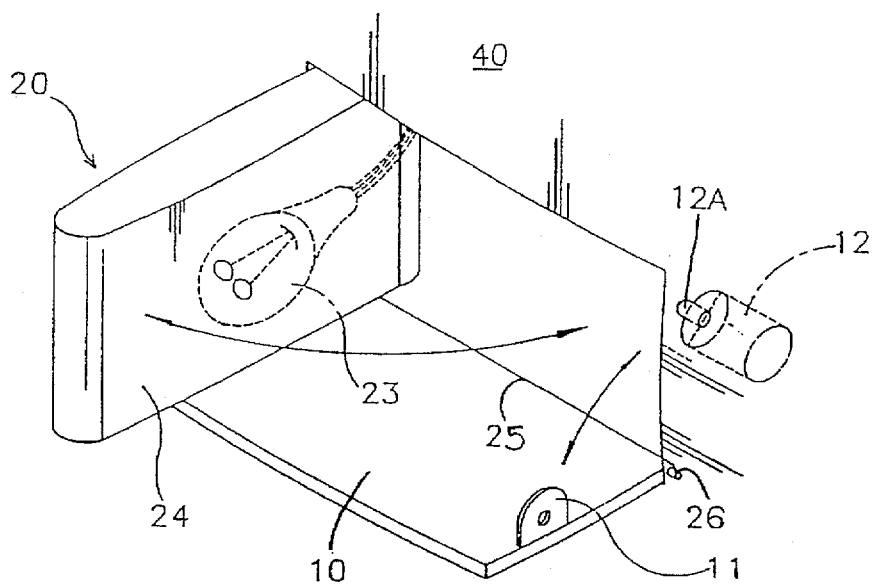
FIG. 3 is a perspective view of the emergency turn signal lamp device for a vehicle in operation according to the embodiments of the present invention.

Referring now in detail to the drawings for the purpose of illustrating preferred embodiments of the present invention, the emergency turn signal lamp device for a vehicle as shown in FIGS. 1, 2, and 3 includes a lamp door 10 disposed on a left side quarter panel 40 of a vehicle 60, an emergency signal lamp 20 disposed behind the lamp door 10, a lamp hinge shaft 22 having a spring 21 and attached to one end of the emergency signal lamp 20, a latch 11 attached to the lamp door 10, an electromagnetic switch 12 for locking or releasing the latch 11 depending on the ON/OFF position of the switch 12, and a turn signal controller 30 (FIG. 4) for monitoring an original left turn signal lamp (not shown) and activating the electromagnetic switch 12 to be ON when the original left turn signal lamp is determined to be out of order.

As shown in FIG. 1, the emergency turn signal lamp is disposed behind the left side quarter panel 40, which is located behind a left rear side door panel 50 of the vehicle 60. The lamp door 10 is one portion of the left quarter panel 40. The spring 21 surrounding the lamp hinge shaft 22 has strong resilient force so that the emergency signal lamp 20 springs out from the panel 40 when the lamp door 10 is opened. The emergency signal lamp 20 including a light bulb 23 and a yellow lens 24 encompassing the light bulb 23, is usually locked in by the lamp door 10.

As shown in FIG. 3, the lamp door 10 can be opened by releasing the latch 11 using the electromagnetic switch 12. If the latch 11 is released, the lamp door 10 is pivoted about a line 25 and rotatably opened through a door hinge 26. The electromagnetic switch 12 disposed inside of the left side quarter panel 40 includes a lever shaft 12A, a return spring 12B biased by the lever shaft 12A, and a solenoid 12C operatively connected to the lever shaft 12B as shown in FIG. 2.

According to the present invention, the user, e.g. the driver, operates a multifunctional switch (not shown) to turn on the original left turn signal lamp (not shown). At this time, unfortunately, if the left turn signal lamp is out of order, the left turn signal lamp will not be charged with electricity and the left turn signal will not be generated.

At this time, the controller 30 detects immediately that the left turn signal lamp is not operating and automatically sends a signal, e.g., a lamp operation signal, to the switch 12 for emergency situations. Then, the solenoid 12C is charged with electricity by the controller 30.

Figure 5:
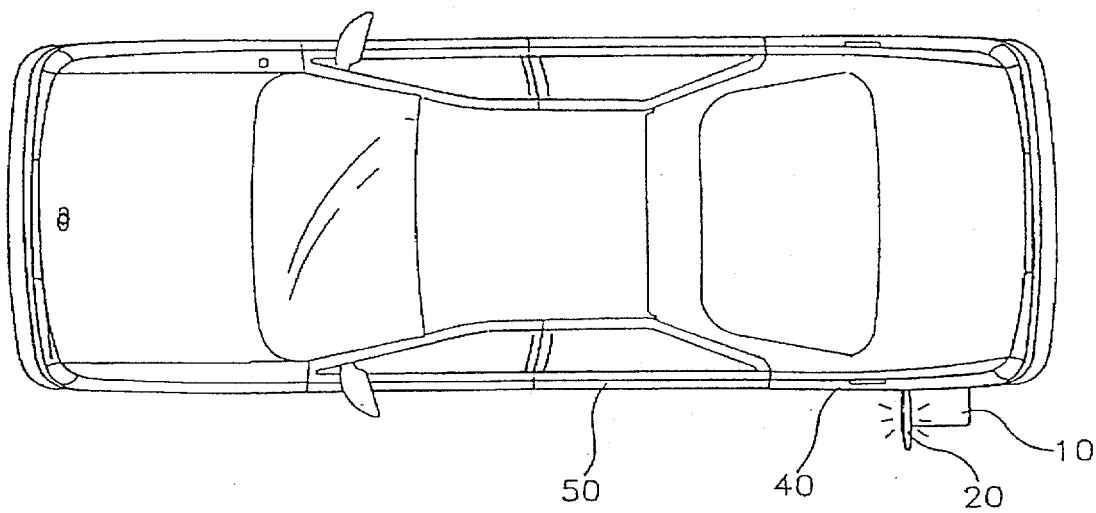
FIG. 5 is a top plan view of the vehicle having the emergency left turn signal lamp device in operation when the original left turn signal lamp is out of order, according to the embodiments of the present invention.

The charged solenoid 12C pulls in the lever shaft 12A so that the lever shaft 12A is released from the latch 11. Therefore, the lamp door 10 opens and the emergency signal lamp 20 is turned ON as shown in FIGS. 3 and 5. If the controller 30 cuts off electricity to solenoid 12C, the lever shaft 12A moves forward by the resilient force of the return spring 12B. Therefore, the lever shaft 12A is inserted back into the latch 11 of the lamp door 10 after the emergency signal lamp 20 and the lamp door 10 return to their original positions.

Figure 4:
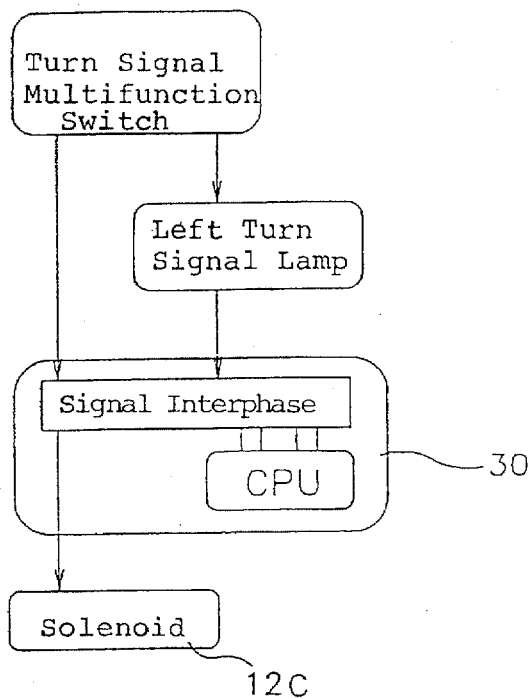
FIG. 4 is a block diagram for illustrating an operation sequence of the emergency turn signal lamp device according to the embodiments of the present invention.

The emergency turn signal lamp device for a vehicle in accordance with the embodiments of the present invention operates as follows. FIG. 4 is a block diagram for illustrating an operational sequence of the emergency turn signal lamp device of the present invention.

First of all, the driver operates the turn signal multifunctional switch in order to activate the left turn signal lamp. At that time, normally the left turn signal lamp flickers and the left turn signal is generated.

However, if there is a problem with the left turn signal lamp or its connection with other elements, it is not charged with electricity and the left turn signal lamp becomes inoperative and out of order. Then, simultaneously, the controller 30 detects that the left turn signal lamp is out of order and immediately operates the emergency left turn signal lamp device of the present invention.

That is, the controller 30 transmits the signal of the multifunctional switch to the switch 12, so that the electromagnetic switch 12 is actuated automatically to the ON position. Then, the electromagnetic switch 12 is charged with electricity to allow the solenoid 12C to attract the lever shaft 12A thereto. Thus, the lever shaft 12A is released from the latch 11 and then the lamp door 10 opens in the direction as indicated by an arrow in FIG. 3 under the control of the door hinge 26. Here, the opened lamp door 10 forms a right angle with the left side quarter panel 40 as shown in FIGS. 3 and 5. At this time, the emergency signal lamp 20 is elastically projected out from the vehicle due to the lamp hinge shaft 22 in the direction as indicated by an arrow. The emergency signal lamp 20 also forms a right angle with the left side quarter panel 40 as shown in FIGS. 3 and 5.

Accordingly, the driver can be assured that a left turn signal is being generated even if the original left turn signal lamp is out of order. The present invention is further advantageous in that the malfunctioning left turn signal lamp can be immediately substituted by the emergency signal lamp 20 and used while the broken left turn signal lamp is being repaired. Thus, the projected emergency signal lamp 20 allows the driver of the rear vehicle to be aware of what the front vehicle is doing, e.g. making a left turn, at all times, whereby traffic accidents can be avoided.

In addition to or in lieu of the emergency signal lamp for left turns, the emergency signal lamp device according to the present invention can be installed on the right side quarter panel of a vehicle on the opposite side of the left turn quarter panel 40. The emergency signal lamp device is also applicable to other parts of a vehicle or other signalling devices, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An emergency signal lamp device for a vehicle, comprising:

a lamp door disposed on a portion of the vehicle;

an emergency signal lamp disposed behind the lamp door and being elastically movable from the vehicle; and latch means for moving the lamp door to control the movement of the emergency signal lamp, wherein the emergency signal lamp generates an emergency turn signal when an original turn signal lamp is malfunctioning.

2. A device of claim 1, wherein the latch means includes:

a latch attached to the lamp door for latching the lamp door to the vehicle, and a switch for controlling the latch.

3. A device of claim 2, wherein the switch includes:

a center shaft for movably cooperating with the latch, a solenoid for moving the latch, and an elastic member for supporting the cooperation of the center shaft with the latch.

4. A device of claim 1, wherein the emergency signal lamp includes:

a light source for generating light, and a lens having the light source therein.

5. A device of claim 4, wherein the emergency signal lamp includes:

a lamp hinge shaft for connecting an edge portion of the lens to the vehicle, and an elastic member for elastically moving the lens.

6. A device of claim 4, wherein the lens is covered with yellow color.

7. A device of claim 4, further comprising:

control means for detecting malfunctioning of the original turn signal lamp and controlling the latch means to move the emergency signal lamp and generate the emergency turn signal.

8. A device of claim 7, wherein the control means includes:

a central processing unit for detecting the malfunctioning of the original turn signal lamp and transmitting a multifunctional signal input by a user to the latch means.

9. A device of claim 4, wherein the emergency signal lamp is disposed at least one of the following portions of the vehicle:

a left side and a right side.

10. A device of claim 1, wherein the emergency signal lamp generates at least one of the following signals:

a left turn signal and a right turn signal.

11. A device of claim 1, wherein the emergency signal lamp is moved from the vehicle, the emergency signal lamp forms a substantially 90° angle with a surrounding vehicle surface.

12. A device of claim 1, wherein when the lamp door is moved to form a substantially 90° angle with a surrounding vehicle surface.

13. A method of providing an emergency signal lamp device in a vehicle, comprising the steps detecting malfunctioning of an original signal lamp;

activating a switch according to the detection;

releasing a latch member by activating the switch; and pivotally moving an emergency signal lamp from the vehicle to generate a turn signal.

14. A method of claim 13, wherein the detecting step includes the step of:

transmitting a multifunctional signal input to the vehicle by a user to the switch to activate the switch, when the malfunctioning of the original signal lamp is detected.

15. A method of claim 13, wherein the activating step includes the step of:

energizing a solenoid.

16. A method of claim 13, wherein the releasing step includes the step of:

elastically moving the latch member from a latch.

17. A method of claim 13, wherein the pivotally moving step includes the steps of:

pivotally moving a lamp door disposed on a portion of the vehicle as the latch member is released, elastically moving the emergency signal lamp from the vehicle, and generating either a left turn signal or a right turn signal using the emergency signal lamp.

18. A device for providing an emergency turn signal in a vehicle, comprising:

control means for detecting malfunctioning of a turn signal lamp, activating a switch according to the detection, and releasing a latch member by activating the switch; and lamp means for generating an emergency turn signal according to the detection.

19. A device of claim 18, wherein the lamp means includes:

a lamp door disposed on a portion of the vehicle, and an emergency signal lamp disposed behind the lamp door and elastically moving from the vehicle as the lamp door is moved to generate the emergency turn signal.

20. A device of claim 18, wherein the lamp means includes:

a light source for generating light, a lens for completely encompassing the light source, a lamp hinge shaft for connecting an edge portion of the lens to the vehicle, and an elastic member for elastically moving the lens.

* * * * *